Patented June 7, 1949

2,472,573

UNITED STATES PATENT OFFICE 2,472,573

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application March 11, 1948, Serial No. 14,397

7 Claims. (Cl. 252—341)

This invention relates to processes or procedures for preventing, breaking, or resolving emulsions of the water-in-oil type, and has for its main object to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Still another object of our invention is to provide an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts from pipeline oil.

Demulsification, as contemplated in the present application, includes the preventive step of commingling the demulsifier with the aqueous component which would or might subsequently become either phase of the emulsion, in absence of such precautionary measure. Similarly, such demulsifier may be mixed with the hydrocarbon component.

The material, compound, product, or composition of matter that is used as the demulsifying agent of our process, consists of a cation-active polychloride. Such cation-active polychlorides are obtained by reaction between an esterified monoamino alcohol or an esterified monoamino alcohol ether, as subsequently described, and diglycol chlorformate sometimes referred to as diethylene glycol bis (chloroformate), the formula for such compound being as follows:

$$\text{O} \begin{cases} \text{CH}_2\text{CH}_2-\text{O}-\text{CO}-\text{Cl} \\ \text{CH}_2\text{CH}_2-\text{O}-\text{CO}-\text{Cl} \end{cases}$$

It is well known that triethanolamine can be esterified with higher fatty acids having 8 to 22 carbon atoms, for example, such as lauric acid, stearic acid, oleic acid, and the like, so as to yield a compound of the formula:

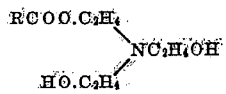

The product of esterified tertiary ethanolamines such as the esters of triethanolamine, ethyldiethanolamine, diethylethanolamine, etc., have been described in the literature, and particularly the patent literature. The best known examples are those of the following formula:

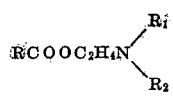

in which RCO is the acyl radical of the higher fatty acid having 8 to 22 carbon atoms, and $R_1$ and $R_2$ are selected from the class of alkyl radicals having not more than 4 carbon atoms (methyl, ethyl, propyl, or butyl) ethanol radicals, or ethanol radicals which have been treated with a mole of ethylene oxide or a mole of glycide.

If one reacts triethanolamine with 3, 2, or 1 mole of ethylene oxide, the following compounds are obtained:

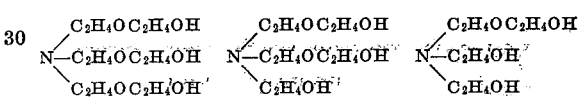

Similarly, if triethanolamine is treated with glycide or if it is converted into the alcoholate and then treated with glycerolchlorhydrin, one then obtains compounds such as the following:

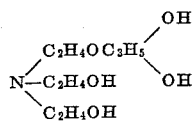

Actually, however, the usual procedure in forming the esters from tertiary amines such as triethanolamine, is to use the glyceride as a matter of economy. The alcoholysis reaction which takes place may be indicated in the following manner:

(1) 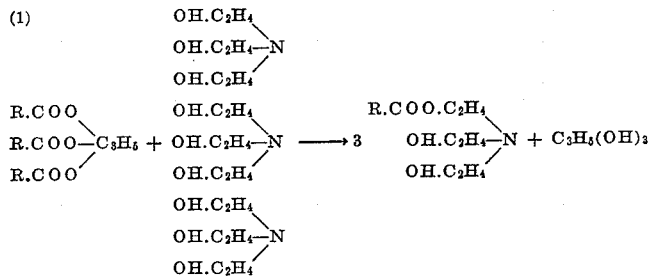

The temperature employed for such reaction is generally 175° or somewhat less, in order to avoid etherization of the amino alcohol. Even so, the glycerol liberated from the glyceride may combine with the triethanolamine before acylation takes place. In any event, the final product may be in part an acylated monoamino ether alcohol. Such compound is identical with the one obtained by esterifying or acylating triethanolamine after first treating such an amine with glycide or the equivalent reaction previously described.

Recapitulating what has been said, it is to be noted that the acyl radical may be attached to the nitrogen atom through the radical which contains the ether linkage. Thus, in the broadest aspect, the acylated monoamino alcohols and the acylated monoamino alcohol ethers herein contemplated as a reactant for combination with diglycol chloroformate, may be indicated by the following formula:

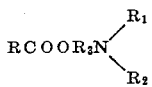

in which RCO is the acyl radical of a high molal monocarboxy acid, particularly a higher fatty acid, and especially, one having 8 to 22 carbon atoms. $R_1$ and $R_2$ are selected from the monovalent radicals.

$CH_3$, $C_2H_5$, $C_3H_7$, $C_4H_9$, $C_2H_4OH$, $C_2H_4OC_2H_4OH$

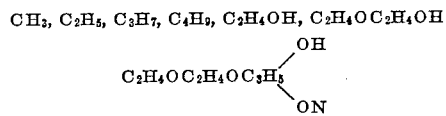

and $R_3$ is selected from the divalent radicals

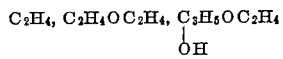

The expression "higher molecular weight carboxy acids" is an expression frequently employed to refer to certain organic acids, particularly monocarboxy acids, having more than 6 carbon atoms and generally less than 40 carbon atoms. The commonest examples include the detergent-forming acids, i. e., those acids which combine with alkalies to produce soap or soap-like bodies. The detergent-forming acids, in turn, include naturally-occuring fatty acids, resin acids, such as abietic acid, naturally-occurring petroleum acids such as naphthenic acids, and carboxy acids produced by the oxidation of petroleum. As will be subseqently indicated, there are other acids which have somewhat similar characteristics and are derived from somewhat different sources, and are different in structure, but can be included in the broad generic term previously indicated.

Among sources of such acids may be mentioned straight chain and branched chain, saturated and unsaturated, carboxylic, aliphatic alicyclic, fatty, aromatic, hydroaromatic, and aralkyl acids including caprylic acid, butyric acid, heptylic acid, caproic acid, capric acid, pimelic acid, sebacic acid, erucic acid, saturated and unsaturated higher molecular weight aliphatic acids, such as the higher fatty acids containing at least 8 carbon atoms, and including in addition to those mentioned, melissic acid, stearic acid, oleic acid, ricinoleic acid, diricinoleic acid, triricinoleic acid, polyricinoleic acid, ricinostearolic acid, ricinoleyl lactic acid, acetylricinoleic acid, linoleic acid, linolenic acid, lauric acid, myristic acid, undecylenic acid, palmitic acid, mixtures of any two or more of the above-mentioned acids or other acids, mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soybean oil, peanut oil, castor oil, seal oils, whale oil, shark oil and other fish oils, teaseed oil, partially or completely hydrogenated animal and vegetable oils, such as these mentioned; hydroxy and alphahydroxy higher carboxylic, aliphatic and fatty acids, such as hydroxystearic acid, dihydroxypalmitic acid, dihydroxystearic acid, dihydroxybehenic acid, alphahydroxy capric acid, alphahydroxy stearic acid, alphahydroxy palmitic acid, alphahydroxy lauric acid, alphahydroxy myristic acid, alphahydroxy cocoanut oil mixed fatty acids, alphahydroxy margaric acid, alphahydroxy arachidic acid, and the like; fatty and similar acids derived from various waxes, such as beeswax, spermaceti, montan wax, japan wax, coccerin, and carnauba wax. Such acids include carnaubic acid, cerotic acid, lacceric acid, montanic acid, psyllastearic acid, etc. As suggested, one may also employ higher molecular weight carboxylic acids derived, by oxidation and other methods, from paraffin wax, petroleum and similar hydrocarbons; resinic and hydroaromatic acids, such as hexahydrobenzoic acid, hydrogenated naphthoic hydrogenated carboxydiphenyl, naphthenic, and abietic acid; aralkyl and aromatic acids, such as hexahydrobenzoic acid, hydrogenated naphtheoic, hydrogenated poly-carboxy-diphenyl, naphthenic, and abietic acid; aralkyl and aromatic acids, such as benzoic acid, Twitchell fatty acids, naphthoic acid, carboxy-diphenyl, pyridine carboxylic acid, hydroxybenzoic acid, and the like.

Other suitable acids include phenylstearic acid, benzoylnonylic acid, campholic acid, fencholic acid, cetyloxybutyric acid, cetyloxyacetic acid, etc.

Another source of suitable acids are those commonly referred to as lac acids, such, for example, as the acids derived from shellac. Such acids include various polyhydroxy acids, for example, aleuritic acid, shelloic acid, and kerrolic acid.

As is well known, one may use substituted acids in which some other non-functional constituent enters the structure of the fatty acid. For instance, one may use aryl-, hydroxy-, alkoxy-, keto and amino-derivatives. Generally speaking, however, it is always preferable to use the unsubstituted acid, particularly free from substituents which contain either oxygen or nitrogen atoms. Generally speaking, the introduction of hydrocarbon radicals, regardless of source, has little effect except in altering the hydrophile-hydrophobe balance.

One may also employ the blown or oxidized acids, such as blown ricinoleic acid, blown oleic, or estolides derived from blown oils, such as blown castor oil, blown soyabean oil, etc.

As previously stated, the acylated monoamino alcohols or the acylated monoamino alcohol ethers herein employed as reactants, are well known compounds and have been described frequently in the literature, particularly the patent literature. Our preference is to obtain them from higher fatty acids or higher fatty acid glycerides and we particularly prefer to employ ricinoleic acid, oleic acid, linoleic acid, linolenic acid, stearic acid, or the glycerides which are a source of such fatty acids such as castor oil, neat's-foot oil, lard oil, soyabean oil, stearine, etc.

We have also found naphthenic acids, particularly those bearing a molecular weight from slightly above 200 to slightly less than 400, to be particularly desirable as reactants. We have also employed resin acids such as rosin, abietic acid, etc. Such compounds are obtainable in the manner described and are sometimes obtained conveniently by treating an acylated monoamino alcohol or acylated monoamino alcohol ether with one or two moles of ethylene oxide or glycide.

Such reactants, all of which are well known, may be exemplified by the following formulae, in which RCO is the acyl radical of a higher fatty acid of the kind described, or the acyl radical of the naphthenic acids as described, or the acyl radical of a resin acid such as abietic acid, etc.:

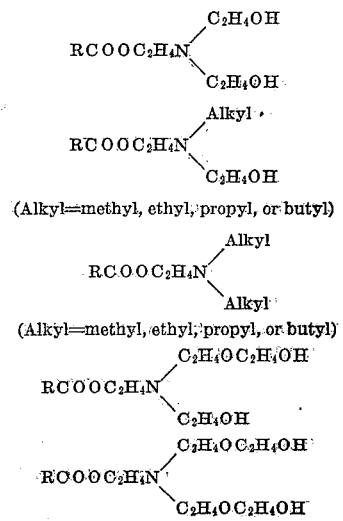

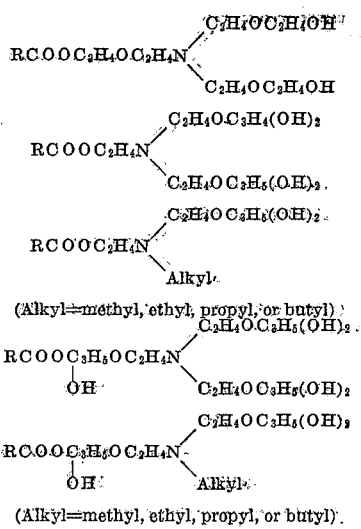

CATION-ACTIVE POLYCHLORIDE

*Example 1*

Two gram moles of the monoricinoleyl ester of triethanolamine (858 grams) is mixed with one gram mole of diglycol chloroformate (58 grams). The mixture was placed in a flask with a suitable stirring device and reflux condenser and heated at 160° to 180° C. for one hour. The mixture showed a tendency to foam when first warmed, but as soon as the reaction started, the foaming tendency decreased. The particular triethanolamine ester employed gave a cloudy solution in water. Diglycol chloroformate is, of course, water-insoluble. The resultant product was sufficiently soluble in water at the end of the reaction period to give a perfectly clear solution and showed a presence of chloride ions.

CATION-ACTIVE POLYCHLORIDE

*Example 2*

The same procedure was followed as in Example 1, preceding, except that two gram moles of the oleic acid ester (826 grams) was employed instead of two gram moles of the ricinoleic acid ester. In all other respects the procedure was identical with that described in Example 1.

CATION-ACTIVE POLYCHLORIDE

*Example 3*

The same procedure was followed as in Example 1, preceding, except that two gram moles of the stearic acid ester (830 grams) was employed instead of two gram moles of the ricinoleic acid ester. In all other respects the procedure was identical with that described in Example 1.

CATION-ACTIVE POLYCHLORIDE

*Example 4*

The same procedure was followed as in Example 1, preceding, except that two gram moles of the abietic acid ester (866 grams) was employed instead of two gram moles of the ricinoleic acid ester. In all other respects the procedure was identical with that described in Example 1.

CATION-ACTIVE POLYCHLORIDE

*Example 5*

The same procedure was followed as in Example 1, preceding, except that two gram moles of the naphthenic acid ester (712 grams) was employed instead of two gram moles of the ricinoleic acid ester. In all other respects the procedure was identical with that described in Example 1.

The naphthenic acid was obtained from a Gulf Coast crude and had a molecular weight of 225.

CATION-ACTIVE POLYCHLORIDE

Example 6

The same procedure was followed as in the five preceding examples, except that instead of using the triethanolamine ester, there was employed the ester of monoethyldiethanolamine. For convenience, the weights employed are indicated by reference to the subsequent table. The table shows the molecular weights of the ester. As in Example 1, the amount employed was two gram moles in each instance.

CATION-ACTIVE POLYCHLORIDE

Example 7

The same procedure was followed as in the six preceding examples, except that instead of using the triethanolamine ester, there was employed the ester of $$N(C_2H_4OC_2H_4OH)_3$$

For convenience, the weights employed are indicated by reference to the subsequent table. The table shows the molecular weights of the ester. As in Example 1, the amount employed was two gram moles in each instance.

CATION-ACTIVE POLYCHLORIDE

Example 8

The same procedure was followed as in the seven preceding examples, except that instead of using the triethanolamine ester, there was employed the ester of

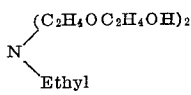

For convenience, the weights employed are indicated by reference to the subsequent table. The table shows the molecular weights of the ester. As in Example 1, the amount employed was two gram moles in each instance.

CATION-ACTIVE POLYCHLORIDE

Example 9

The same procedure was followed as in the eight preceding examples, except that instead of using the triethanolamine ester, there was employed the ester of $$N[C_2H_4OC_3H_5(OH)_2]_3$$

For convenience, the weights employed are indicated by reference to the subsequent table. The table shows the molecular weights of the ester. As in Example 1, the amount employed was two gram moles in each instance.

CATION-ACTIVE POLYCHLORIDE

Example 10

The same procedure was followed as in the nine preceding examples, except that instead of using the triethanolamine ester, there was employed the ester of

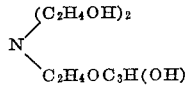

For convenience, the weights employed are indicated by reference to the subsequent table. The table shows the molecular weights of the ester. As in Example 1, the amount employed was two gram moles in each instance.

This type of acylated ester can be obtained by a number of procedures, two of which are as follows:

(1) Treat triethanolamine with one mole of glycide and then acylate.

(2) Prepare the acylated ester of triethanolamine and then treat with one mole of glycide. If this procedure is followed, the acyl radical is attached to the ethoxy radical. If the first procedure is followed, one may obtain a mixture of acylated derivatives in which part are characterized by attachment of the acyl radical to the ethoxy radical and part by attachment of the acyl radical to the ether radical.

For convenience, the following table is submitted:

MOLECULAR WEIGHT MONO-ACYL DERIVATIVE

| | Triethanolamine | Monoethyldiethanolamine | $N(C_2H_4OC_2H_4OH)_3$ | $(C_2H_4OC_2H_4OH)_2$ $N$ Ethyl | $N[C_2H_4OC_3H_5(OH)_2]_3$ | $C_2H_4OH$ $HOC_2H_4N$ $C_2H_4OC_3H_5$ $OH$ $OH$ |
|---|---|---|---|---|---|---|
| Ricinoleic | 429 | 413 | 561 | 457 | 651 | 503 |
| Oleic | 413 | 397 | 545 | 441 | 635 | 487 |
| Stearic | 415 | 399 | 547 | 443 | 637 | 489 |
| Abietic | 433 | 417 | 565 | 461 | 655 | 507 |
| Naphthenic from Gulf Coast Crude MW=225 | 356 | 340 | 488 | 384 | 578 | 430 |

It is obvious that in some instances the hydroxyl available for reaction with the diglycol chloroformate, may be furnished by the acyl radical of the mono-carboxy acid, as in the case of ricinoleic acid, hydroxystearic acid, dihydroxystearic acid, and other hydroxylated acids obtained by the action of hydrogen peroxide on unsaturated fatty acids including undecylenic acid.

In light of what has been said immediately preceding, it is obvious that the amine employed may also include types such as diethylethanolamine, dipropylethanolamine, dibutylethanolamine, and the comparable dialkyl derivatives of glycerylamine. Similarly, an amine of the last mentioned type may be treated with one mole of ethylene oxide prior to acylation, or, inversely, the dialkyl ethanolamines may be treated with a mole of glycide or an equivalent reaction employed prior to acylation.

When prepared from the simplest and most readily available reactants, i. e., 18 carbon fatty acids and triethanolamine, the structures obtained are indicated by the following reaction and formula, assuming that, if the acyl radical has an alcoholic hydroxyl, reaction takes place preferentially at the ethanol hydroxyl, for the reason that the latter is a primary alcoholic radical and the former is a secondary alcoholic radical.

(2) 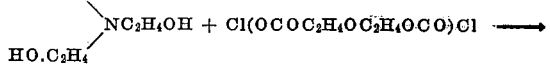

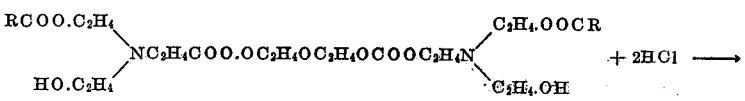

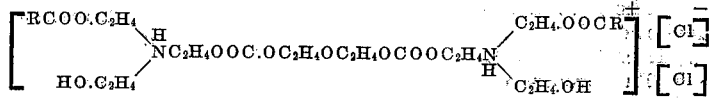

Conventional demulsifying agents employed in the treatment of oil field emulsions are used as such, or after dilution with any suitable solvent, such as water; petroleum hydrocarbons, such as gasoline, kerosene, stove oil; a coal tar product such as benzene, toluene, xylene, tar acid oil, cresol, anthracene oil, etc. Alcohols, particularly aliphatic alcohols, such as methyl alcohol, ethyl alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process for resolving emulsions, may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, or even 1 to 40,000, or 1 to 50,000 in desalting practice, such an apparent insolubility in oil and water is not significant, because said reactants undoubtedly have solubility within the concentration employed. This same fact is true in regard to the material or materials employed as the demulsifying agent of our process.

We desire to point out that the superiority of the reagent or demulsifying agent contemplated in our process, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used either alone or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to emergence of said fluids. This particular type of application is decidedly feasible when the demulsifier is used in connection with acidification of calcareous oil-bearing strata, especially if suspended in or dissolved in the acid employed for acidification.

A somewhat analogous use of our demulsifying agent is in the removal of a residual mud sheath which remains after drilling a well by the rotary method. Sometimes the drilling mud contains added calcium carbonate, or the like, to render the mud susceptible to reaction with hydrochloric acid, or the like, and thus expedite its removal.

Having thus described our invention, what we claim and desire to secure by Letters Patent is:

1. A process for breaking petroleum emulsions of the water-in-oil type, characterized by subjecting the emulsion to the action of a demulsifier including a cation-active polychloride, said cation-active polychloride being the reaction product of diglycol chloroformate and a hydroxylated mono-acylated amine of the following formula:

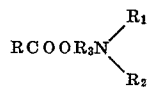

in which RCO is the acyl radical of a higher fatty acid having at least 8 and not more than 22 carbon atoms and $R_1$ and $R_2$ are selected from the class consisting of the monovalent radicals

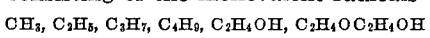

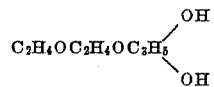

and $R_3$ is selected from the class consisting of the divalent radicals

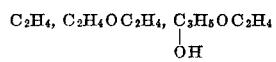

with the further proviso that there be at least one occurrence of an alcoholic hydroxyl radical in the radicals R, $R_1$, $R_2$, and $R_3$.

2. The process of claim 1, wherein the ratio of the hydroxylated mono-acylated amine to chloroformate is 2 to 1.

3. A process for breaking petroleum emulsions of the water-in-oil type, characterized by subjecting the emulsion to the action of a demulsifier including a cation-active polychloride of the following formula:

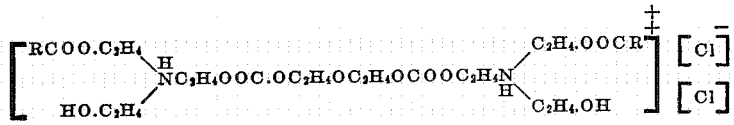

wherein RCO is the acyl radical of a higher fatty acid having at least 8 and not more than 22 carbon atoms.

4. The process of claim 3, wherein RCO is the acyl radical of an unsaturated fatty acid having 18 carbon atoms.

5. The process of claim 3, wherein RCO is a ricinoleyl radical.

6. The process of claim 3, wherein RCO is an oleyl radical.

7. The process of claim 3, wherein RCO is a linoleyl radical.

MELVIN DE GROOTE.
BERNHARD KEISER.

REFERENCES CITED

The following references are of record in the file of this patent:

UNITED STATES PATENTS

| Number | Name | Date |
|---|---|---|
| Re. 22,963 | Monson et al. | Jan. 13, 1948 |
| 2,167,349 | De Groote et al. | July 25, 1939 |
| 2,231,754 | De Groote et al. | Feb. 11, 1941 |
| 2,306,329 | De Groote et al. | Dec. 22, 1942 |
| 2,368,208 | Epstein et al. | Jan. 30, 1945 |
| 2,373,174 | De Groote et al. | Apr. 10, 1945 |
| 2,390,078 | De Groote et al. | Dec. 4, 1945 |